United States Patent
Jeon et al.

(10) Patent No.: US 7,403,571 B2
(45) Date of Patent: Jul. 22, 2008

(54) METHOD FOR ELIMINATING RECEPTION INTERFERENCE SIGNAL OF SPACE-TIME BLOCK CODED ORTHOGONAL FREQUENCY DIVISION-MULTIPLEXING SYSTEM IN HIGH-SPEED MOBILE CHANNEL

(75) Inventors: Won Gi Jeon, Pyungtaek (KR); Jeong Wook Seo, Pyungtaek (KR); Jung Wook Wee, Namyangju (KR); Dong Sun Kim, Incheon (KR)

(73) Assignee: Korea Electronics Technology Institute (KR)

( * ) Notice: Subject to any disclaimer, the term of this patent is extended or adjusted under 35 U.S.C. 154(b) by 575 days.

(21) Appl. No.: 11/086,441

(22) Filed: Mar. 23, 2005

(65) Prior Publication Data

US 2006/0215773 A1 Sep. 28, 2006

(51) Int. Cl.
*H04B 7/02* (2006.01)

(52) U.S. Cl. .................. 375/267; 375/260; 375/347; 375/298

(58) Field of Classification Search .......... 375/347, 375/298, 267; 370/310
See application file for complete search history.

(56) References Cited

U.S. PATENT DOCUMENTS

| | | | |
|---|---|---|---|
| 6,834,043 B1 | 12/2004 | Vook et al. | |
| 2004/0072594 A1 | 4/2004 | Hwang et al. | |
| 2004/0208254 A1 | 10/2004 | Lee et al. | |
| 2005/0281361 A1* | 12/2005 | Kim | 375/347 |
| 2006/0098754 A1* | 5/2006 | Kim et al. | 375/267 |
| 2006/0176977 A1* | 8/2006 | Jafarkhani et al. | 375/298 |
| 2007/0258392 A1* | 11/2007 | Larsson et al. | 370/310 |

\* cited by examiner

*Primary Examiner*—Chieh M. Fan
*Assistant Examiner*—Sudhanshu C. Pathak
(74) *Attorney, Agent, or Firm*—Edell, Shapiro & Finnan, LLC

(57) ABSTRACT

Disclosed herein is a method for eliminating the reception interference signal of a Space-Time Block Coded Orthogonal Frequency-Division Multiplexing (STBC-OFDM) system in a high-speed mobile channel. The method includes the following steps. At the first step, the gain of a channel combined at a receiving end is estimated in the case of using the STBC-OFDM system on a time-varying channel. At the second step, first temporary decision symbols are obtained by performing comparison on the estimated gain. At the third step, second temporary decision symbols are obtained using the first temporary decision symbols. At the fourth step, self-channel interference (SCI) terms are eliminated using the second temporary decision symbols and third temporary decision symbols are obtained. At the fifth step, final data symbols are obtained using the third temporary decision symbols.

23 Claims, 3 Drawing Sheets

[FIG. 1]
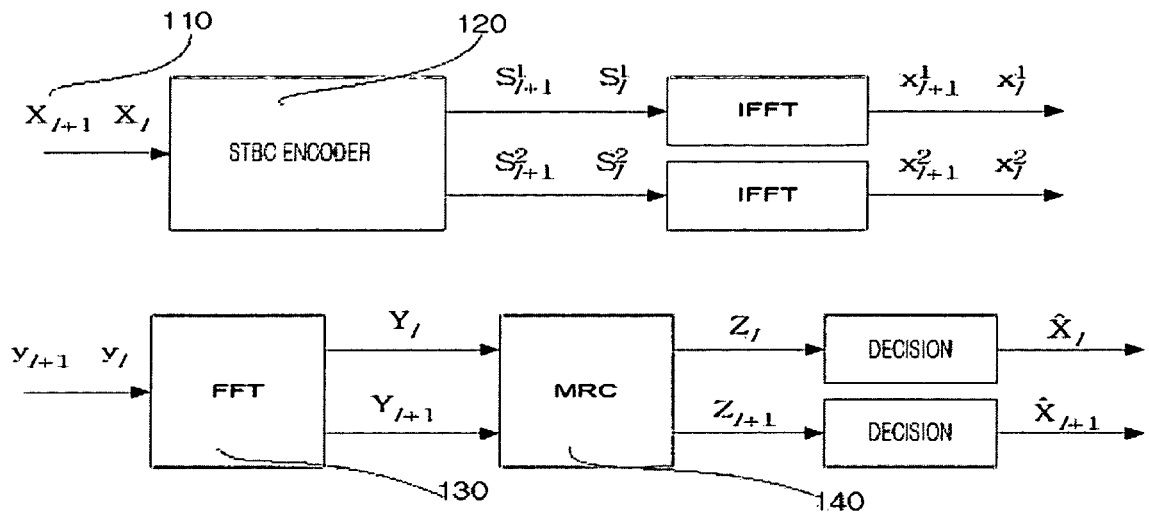
[FIG. 2]
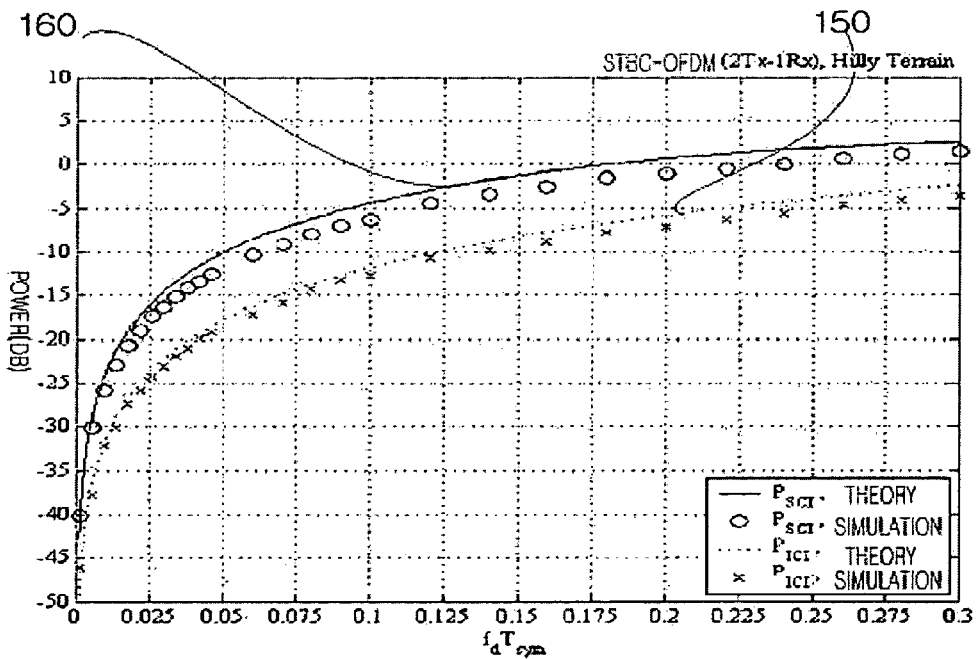

[FIG. 5]

(a) COMB TYPE (b) MODIFIED COMB TYPE

METHOD FOR ELIMINATING RECEPTION INTERFERENCE SIGNAL OF SPACE-TIME BLOCK CODED ORTHOGONAL FREQUENCY DIVISION-MULTIPLEXING SYSTEM IN HIGH-SPEED MOBILE CHANNEL

BACKGROUND OF THE INVENTION

1. Field of the Invention

The present invention relates generally to a method for eliminating a reception interference signal of a space-time block coded orthogonal frequency division-multiplexing system in a high-speed mobile channel and, more particularly, to receiving end and transmitting end technologies that can compensate for self-channel interference that occurs simultaneously with inter-channel interference on a receiver due to the time-varying characteristics of a channel in the case of using space-time block coded orthogonal frequency division-multiplexing in a high-speed mobile environment.

2. Description of the Related Art

In general, Orthogonal Frequency-Division Multiplexing (OFDM) is a frequency multiplexing method in which data is split into a plurality of sub-carriers and is transmitted on the sub-carriers. OFDM refers to a frequency multiplexing communication method that is capable of separating sub-carriers on a receiver regardless of the overlap of spectra by imposing a specific orthogonal condition between the frequencies of the sub-carriers.

Meanwhile, in a Space-Time Block Coded Orthogonal Frequency-Division Multiplexing (STBC-OFDM) system, Inter-Channel Interference (ICI) and Self-Channel Interference (SCI) simultaneously occur due to the time-varying characteristics of channels, so that the magnitude of noise increases, thus increasing a decision-error probability.

The prior art, U.S. Pat. No. 6,442,130, discloses a method for eliminating interference generated in an OFDM system, in which, using a grating array and a Viterbi decoder, a channel is acquired and data symbols are obtained, and then interference is eliminated using the data symbols. However, the prior art requires many devices, including a plurality of signal generation devices and measurement devices, to evaluate the performance of systems using array antennas, which have interference elimination functionality, as receiving antennas, so that the prior art is disadvantageous in that the cost and complexity of equipment increase.

Furthermore, the prior art, U.S. Pat. No. 6,549,581 discloses a method for eliminating interference generated in an OFDM system, in which the interference between channels is eliminated by a multiplication of the data of a single block using a matrix. However, this prior art is a method of eliminating the ICI other than the SCI. In a time-varying channel, the SCI rather than the ICI produces more important distortion in STBC-OFDM, so that this prior art is disadvantageous in that a technique of reducing the SCI rather than the ICI is required to improve the performance of an STBC-OFDM system.

SUMMARY OF THE INVENTION

Accordingly, the present invention has been made keeping in mind the above problems occurring in the prior art, and an object of the present invention is to provide a receiving and transmitting end technology that is capable of eliminating the SCI that occurs due to the time-varying characteristics of a channel in the case of using an STBC-OFDM transmission method in a high-speed mobile environment.

In order to accomplish the above object, the present invention provides a method for eliminating the reception interference signal of an STBC-OFDM system in a high-speed mobile channel, including the first step of estimating the gain of a channel combined at a receiving end in the case of using the STBC-OFDM system in a time-varying channel; the second step of obtaining first temporary decision symbols by performing comparison on the estimated gain; the third step of obtaining second temporary decision symbols using the first temporary decision symbols; the fourth step of eliminating the SCI terms using the second temporary decision symbols and obtaining third temporary decision symbols; and the fifth step of obtaining final data symbols using the third temporary decision symbols.

BRIEF DESCRIPTION OF THE DRAWINGS

The above and other objects, features and advantages of the present invention will be more clearly understood from the following detailed description taken in conjunction with the accompanying drawings, in which:

FIG. 1 is a block diagram showing an STBC-OFDM transmitting end having two transmitting antennas (M=2), and a receiving end having one receiving antenna (K=1), according to the present invention;

FIG. 2 is a graph showing the comparison of STBC-OFDM the SCI with the ICI on a Rayleigh fading channel in the case in which M=2 and K=1;

FIG. 5 is an example of a pre-processing technique for eliminating the SCI in the case in which M=4 and K=2.

DESCRIPTION OF THE PREFERRED EMBODIMENTS

Figure 3:
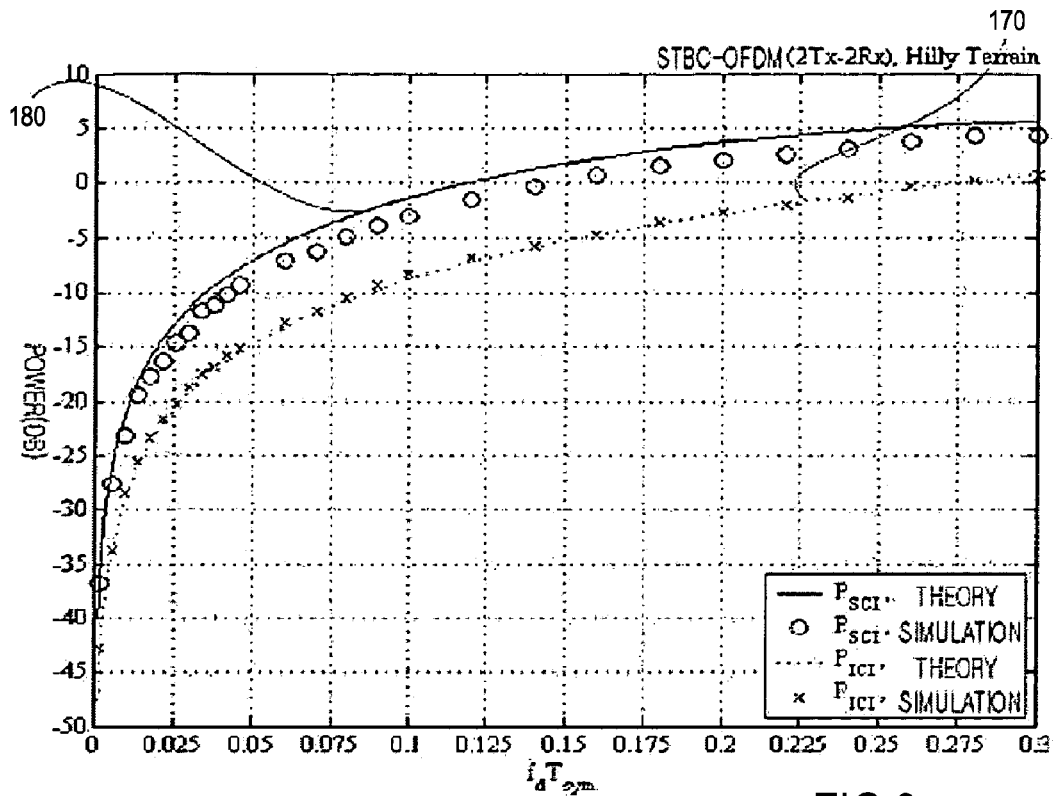
FIG. 3 is a graph showing the comparison of STBC-OFDM the SCI with the ICI on a Rayleigh fading channel in the case in which M=2 and K=2.

Reference now should be made to the drawings, in which the same reference numerals are used throughout the different drawings to designate the same or similar components.

FIG. 1 schematically illustrates an STBC-OFDM transmitting and receiving end, with two transmitting antennas (M=2) and one receiving antenna (K=1). In FIG. 1, a data vector 110, $X_{l+d}(d=0, 1)$, is input to an STBC encoder 120, and the STBC encoder 120 encodes the input data as follows:

$$\begin{bmatrix} X_l(k) \\ X_{l+1}(k) \end{bmatrix} \xrightarrow{STBC} \begin{bmatrix} S_l^1(k) & S_l^2(k) \\ S_{l+1}^1(k) & S_{l+1}^2(k) \end{bmatrix} = \begin{bmatrix} X_l(k) & X_{l+1}(k) \\ -X_{l+1}^*(k) & X_l^*(k) \end{bmatrix} \underset{\overrightarrow{space}}{\Big\downarrow_{time}} \quad (1)$$

In Equation 1, l is an OFDM symbol period, and k is a sub-carrier index. A baseband modulation signal transmitted through an i-th transmitting antenna in an (l+d)-th OFDM symbol period is as follows:

$$x_{l+d}^i = [x_{l+d}^i(0), x_{l+d}^i(1), L, x_{l+d}^i(N-1)]^T \quad (2)$$

$$= IDFT\{S_{l+d}^i\} = \frac{1}{N} F S_{l+d}^i$$

In Equation 2, d=0 or 1, i=1 or 2, and $S_l^i=[S_l^i(0), S_l^i(1), L, S_l^i(N-1)]^T$. Furthermore, F is an IDFT matrix whose (n, k)-th element is $e^{j2\pi nk/N}(0 \leq n \leq N-1$, where n is an integer). N is an IDFT size and represents the number of overall sub-carriers. From Equation 2, an n-th sample signal is as follows:

$$x_{l+d}^i(n) = \frac{1}{N}\sum_{k=0}^{N-1} S_{l+d}^i(k)e^{j2\pi nk/N} \tag{3}$$

$x_l^i$ and $x_{l+1}^i$ are transmitted in the l-th and (l+1)-th OFDM symbol periods, respectively, and the following received signal can be obtained at d=0 or 1 at a receiving end in the case in which the number of receiving antennas is 1 (K=1).

$$y_{l+d}(n) = \sum_{i=1}^{2}\left\{\sum_{v=0}^{V-1} h_{l+d}^i(n;v)x_{l+d}^i(n-v)\right\} + w_{l+d}(n) \tag{4}$$

In Equation 4, $h_{l+d}^i(n;v)$ represents a discrete-time channel impulse response at sampling time n that exists between an i-th transmitting antenna and the receiving antenna in an l-th OFDM symbol period. On the assumption that a multi-path channel is Wide-Sense Stationary Uncorrelated Scattering (WSSUS), the size of $h_1(n;v)$ has Rayleigh distribution, the phase thereof has uniform distribution, and they have characteristics independent of v. V represents the number of overall samples of the discrete-time channel impulse response, and $w_l(n)$ is a discrete-time representation of Additive White Gaussian Noise (AWGN). As understood from Equation 4, a received signal is a linear combination of signals transmitted from two transmitting antennas when transmission diversity is used, so that the l-th and (l+1)-th demodulated signals can be obtained by performing a fast Fourier transform (FFT) on Equation 4.

$$Y_l(m) = \sum_{i=1}^{2}\{S_l^i(m)H_l^i(m) + I_l^i(m)\} + W_l(m) \tag{5}$$
$$= X_l(m)H_l^1(m) + X_{l+1}(m)H_l^2(m) + I_l^1(m) + I_l^2(m) + W_l(m)$$

$$Y_{l+1}(m) = \sum_{i=1}^{2}\{S_{l+1}^i(m)H_{l+1}^i(m) + I_{l+1}^i(m)\} + W_{l+1}(m) \tag{6}$$
$$= -X_{l+1}^*(m)H_{l+1}^1(m) + X_l^*(m)H_{l+1}^2(m) + I_{l+1}^1 + I_{l+1}^2(m) + W_{l+1}(m)$$

In Equation 6, $I_l^i(m)$ is the ICI generated due to a time-varying channel, and is expressed as follows:

$$I_l(m) = \sum_{\substack{k=0\\k\neq m}}^{N-1} X_l(k)H_l(m;k) \tag{7}$$

In Equation 7, $H_l^i(m;k)$ is as follows:

$$H_l(m;k) = \frac{1}{N}\sum_{v=0}^{V-1}\left\{\sum_{n=0}^{N-1} h_l(n;v)e^{j2\pi n(k-m)/N}\right\}e^{-j2\pi vk/N} \tag{8}$$

In Equations 5 and 6, it is denoted that $H_l(m;m)=H_l(m)$. If the complex conjugate numbers of both sides of Equation 6 are obtained, and a right side can be expressed in terms of $X_l(m)$ and $X_{l+1}(m)$ as follows:

$$Y^*_{l+1}(m) = X_l(m)H_{l+1}^{2*}(m) + X_{l+1}(m)\{-H_{l+1}^{1*}(m)\} + I_{l+1}^{1*}(m) + I_{l+1}^{2*}(m) + W_{l+1}^*(m) \tag{9}$$

As a result, when M=2 and K=1, and using the equation 5 and 6, the demodulated STBC-OFDM symbols can be represented as follows:

$$Y_l(m) = H_l(m)X_l(m) + I_l(m) + W_l(m) \tag{10}$$

where $Y_l(m)$, $H_l(m)$, $X_l(m)$, $I_l(m)$ and $W_l(m)$ are as follows:

$$Y_l(m) = \begin{bmatrix} Y_l(m) \\ Y_{l+m}^*(m) \end{bmatrix},$$

$$X_l(m) = \begin{bmatrix} X_l(m) \\ X_{l+1}(m) \end{bmatrix},$$

$$H_l(m) = \begin{bmatrix} H_l^1(m) & H_l^2(m) \\ H_{l+1}^{2*}(m) & -H_{l+1}^{1*}(m) \end{bmatrix}$$

$$I_l(m) = \begin{bmatrix} I_l^1(m) + I_l^2(m) \\ I_{l+1}^{1*}(m) + I_{l+1}^{2*}(m) \end{bmatrix},$$

$$W_l(m) = \begin{bmatrix} W_l(m) \\ W_{l+1}^*(m) \end{bmatrix}$$

In order to obtain diversity gain, linear combining (refer to reference numeral 140) is performed using Equation 10 as follows:

$$Z_l(m) = G_l(m)Y_l(m) \tag{11}$$
$$= G_l(m)H_l(m)X_l(m) + G_l(m)\{I_l(m) + W_l(m)\}$$

In Equation 11, a decision variable vector $Z_l(m)$ and an combining coefficient vector $G_l(m)$ are as follows:

$$Z_l(m) = \begin{bmatrix} Z_l(m) \\ Z_{l+1}(m) \end{bmatrix} \tag{12}$$

$$G_l(m) = \begin{bmatrix} H_l^{1*}(m) & H_{l+1}^2(m) \\ H_l^{2*}(m) & -H_{l+1}^1(m) \end{bmatrix} \tag{13}$$

Equation 11 is arranged as follows:

$$Z_l(m) = \Gamma_l(m)X_l(m) + \Lambda_l(m)X_{l+1}(m) + \Omega_l(m) + W_l(m) \tag{14}$$

$$Z_{l+1}(m) = \Gamma_{l+1}(m)X_{l+1}(m) + \Lambda_{l+1}(m)X_l(m) + \Omega_{l+1}(m) + W_{l+1}(m) \tag{15}$$

In Equations 14 and 15, variables are as follows:

$$\Gamma_l(m) = |H_l^1(m)|^2 + |H_{l+1}^2(m)|^2 \tag{16}$$

$$\Lambda_l(m) = H_l^{1*}(m)H_l^2(m) - H_{l+1}^{1*}(m)H_{l+1}^2(m) \tag{17}$$

$$\Omega_l(m) = H_l^{1*}(m)\{I_l^1(m)+I_l^2(m)\} + H_{l+1}^2(m)\{I_{l+1}^{1*}(m) + I_{l+1}^{2*}(m)\} \tag{18}$$

$$W_l(m) = H_l^{1*}(m)W_l(m) + H_{l+1}^2(m)W_{l+1}^*(m) \tag{19}$$

$$\Gamma_{l+1}(m) = |H_{l+1}^1(m)|^2 + |H_l^2(m)|^2 \tag{20}$$

$$\Lambda_{l+1}(m) = H_l^1(m)H_l^{2*}(m) - H_{l+1}^1(m)H_{l+1}^{2*}(m) \quad (21)$$

$$\Omega_{l+1}(m) = H_l^{2*}(m)\{I_l^1(m) + I_l^2(m)\} - H_{l+1}^1(m)\{I_{l+1}^{1*}(m) + I_{l+1}^{2*}(m)\} \quad (22)$$

$$W_{l+1}(m) = -H_l^{2*}(m)W_l(m) - H_{l+1}^1(m)W_{l+1}^*(m) \quad (23)$$

In Equations 18 and 22, $\Omega_l(m)$ and $\Omega_{l+1}(m)$ represent the ICI components that are generated due to a time-varying channel. $\Lambda_l(m)$ and $\Lambda_{l+1}(m)$ represent the SCI caused by channel variation during two OFDM symbol periods. When $X_l(m)$ is to be determined in Equation 14, $X_{l+1}(m)$ acts as interference; and when $X_{l+1}(m)$ is to be determined in Equation 15, $X_l(m)$ acts as interference. Accordingly, $\Lambda_l(m)X_{l+1}(m)$ and $\Lambda_{l+1}(m)X_l(m)$ are referred to as the SCI, which is generated due to the time-varying characteristics of a channel, to distinguish between it and the ICI.

In the STBC-OFDM system, both ICI and SCI occur in the decision symbols of Equations 14 and 15 due to the time-varying characteristics of a channel, so that the magnitude of noise increases, thus increasing an decision-error probability. In this case, the power of the ICI, $P_{ICI}$, and the power of the SCI, $P_{SCI}$, can be obtained using the following Equations 24 and 25 in the case of two transmitting antennas and one receiving antenna.

$$P_{ICI} \leq \frac{1}{6}(2\pi f_d T_{sym})^2 \quad (24)$$

$$P_{SCI} = 2[1 - J_0^2(2\pi f_d T_{sym})] \quad (25)$$

In the above Equations, $f_d$ is a Doppler frequency and $T_{sym}$ is an OFDM symbol period. $J_0(\cdot)$ represents the zeroth-order Bessel function of the first kind. Equation 24 represents the maximum value that may occur in the case of a classical Doppler channel model. When two transmitting antennas and two receiving antennas are employed, the powers are as follows:

$$P_{SCI} = 4[1 - J_0^2(2\pi f_d T_{sym})] \quad (26)$$

$$P_{ICI} \leq \frac{1}{3}(2\pi f_d T_{sym})^2 \quad (27)$$

FIG. 2 illustrates Equations 24 and 25 while comparing Equation 24 with Equation 25. FIG. 3 illustrates Equations 26 and 27. It can be understood from FIGS. 2 and 3 that simulation results are similar to theoretical values and the powers 150 and 170 of the ICI are greater than the powers 160 and 180 of the SCI by about 7~8 dB.

When the STBC-OFDM system is used on a time-varying channel in such a way as described above, the gain of a combined channel at a receiving end is estimated and, thereafter, the SCI can be eliminated.

Figure 4:
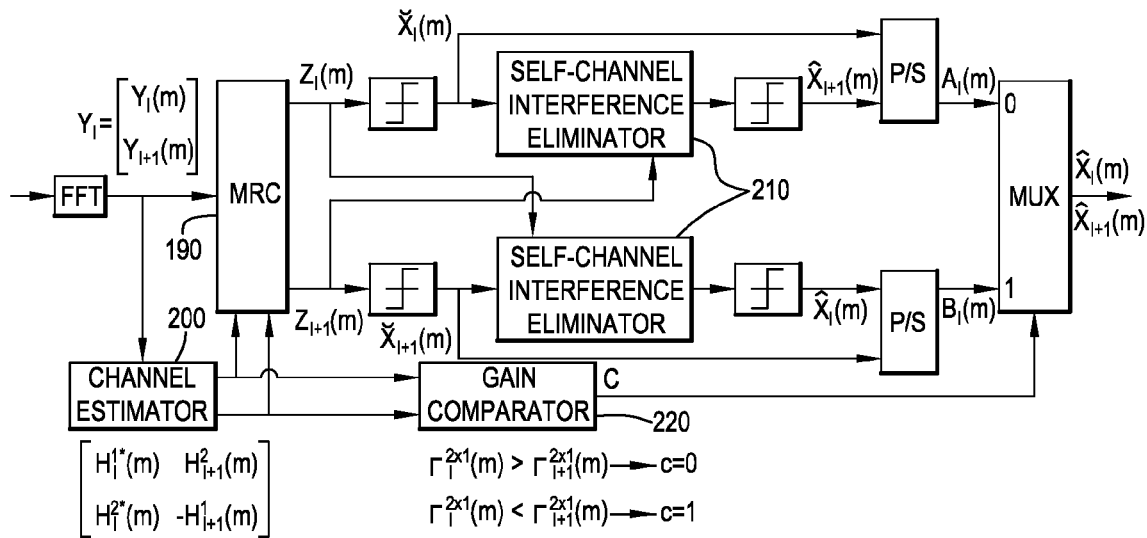
FIG. 4 is a block diagram showing a SCI post-processing eliminator for eliminating the SCI of an STBC-OFDM system in the case in which M=2 and K=1.

FIG. 4 is a block diagram showing a SCI post-processing eliminator for the STBC-OFDM system. In Equations 14 and 15, the signal component gain $\Gamma_l(m)$ of $Z_l(m)$ and the signal component gain $\Gamma_{l+1}(m)$ of $Z_{l+1}(m)$ may be different from each other. Accordingly, if a signal decision for a signal having higher gain is made first and, thereafter, a signal decision for the remaining signal is made using the first decision result when a data decision is made based on $Z_l(m)$ and $Z_{l+1}(m)$, the interference due to a time-varying channel can be reduced. For this purpose, combined gain for the signal components of $Z_l(m)$ and $Z_{l+1}(m)$ must be known (refer to 190), and can be obtained through a channel estimation process (refer to 200). As a result, if $H_l^1(m)$, $H_{l+1}^1(m)$, $H_l^2(m)$ and $H_{l+1}^2(m)$ have been known in advance, the data decision to be made first is determined by calculating $|H_l^1(m)|^2 + |H_{l+1}^1(m)|^2$ and $|H_l^2(m)|^2 + |H_{l+1}^1(m)|^2$ and comparing two calculated values with each other. To describe the above-described process, $\Pi H\{\cdot\}$ is defined as a data decision rule. From Equations 14 and 15, first temporary decision symbols $X_l^{\%}(m) = \Pi\{Z_l(m)\}$ and $X_{l+1}^{\%}(m) = \Pi\{Z_{l+1}(m)\}$ are obtained. To select more reliable data among two resulting data symbols, selection parameters are defined as follows:

$$A_l(m) = \{\text{sign}(\Gamma_l(m) - \Gamma_{l+1}(m)) + 1\}/2 \quad (28)$$

$$A_{l+1}(m) = \{\text{sign}(\Gamma_{l+1}(m) - \Gamma_l(m)) + 1\}/2 \quad (29)$$

Both $A_l(m)$ and $A_{l+1}(m)$ have values of 0 or 1, and using the values of $A_l(m)$ and $A_{l+1}(m)$, second temporary decision symbols are obtained as follows:

$$\check{X}_{l+d}(m) = A_{l+d}(m)X_{l+d}^{\%}(m), \, d=0,1 \quad (30)$$

At the next step, third temporary decision symbols expressed by Equations 31 and 32 are obtained by eliminating the SCI terms from $Z_l(m)$ and $Z_{l+1}(m)$ using the second temporary decision symbols (refer to 210).

$$\hat{X}_l(m) = \Pi\{Z_l(m) - A_l(m)\check{X}_{l+1}(m)\}A_{l+1}(m) \quad (31)$$

$$\hat{X}_{l+1}(m) = \Pi\{Z_{l+1}(m) - A_l^*(m)\check{X}_l(m)\}A_l(m) \quad (32)$$

In the above equations, $\Lambda_l^{\%}(m)$ represents the estimated value of $\Lambda_l(m)$. Finally, the final data symbols expressed as Equation 33 are obtained from Equations 30 to 32 (refer to 220).

$$\hat{X}_{l+d}(m) = \hat{X}_{l+d}(m) + \check{X}_{l+d}(m), \, d=0,1 \quad (33)$$

Next, a pre-process elimination technique for eliminating the SCI, in which encoding is performed at a transmitting end to prevent the generation of the SCI terms, will be described. As seen from Equations 14 and 15, the SCI term of $Z_l(m)$ obtained from an m-th sub-channel in an the l-th symbol period is generated by a data symbol $X_{l+1}(m)$ transmitted on the m-th sub-channel in an (l+1)-th symbol period and the SCI term of $Z_{l+1}(m)$ is generated by a data symbol $X_l(m)$ transmitted on the m-th sub-channel in an l-th symbol period. Accordingly, using the above-described fact, the SCI can be eliminated at the same bandwidth efficiency with the automatic elimination method of the ICI. That is, to eliminate the SCI from $Z_l(m)$, transmission is performed with $X_{l+1}(m)$ being set to 0, or to eliminate the SCI from $Z_{l+1}(m)$, transmission is performed with $X_l(m)$ being set to 0. In this case, to satisfy the above-described requirement while using the structure of the STBC-OFDM system without change, the following STBC encoding conditions are applied.

$$\underline{S}_l^1 \mathsf{U} \underline{S}_l^2 = \underline{X}_l$$

$$\underline{S}_{l+1}^1 \mathsf{U} \underline{S}_{l+1}^2 = \underline{X}_l^* \quad (34)$$

$$\underline{S}_l^1 \mathsf{I} \underline{S}_l^2 = \underline{S}_{l+1}^1 \mathsf{I} \underline{S}_{l+1}^2 = \{\varnothing\}$$

In Equation 34, $\underline{S}_l^i$ and $\underline{X}_l$ are complex sets that have the factors of $\underline{S}_l^i$ and $\underline{X}_l$ as elements, respectively, and have a size N, and $\underline{S}_l^i$ and $\underline{X}_l$ are represented as $\underline{S}_l^i = \{S_l^i(0), S_l^i(1), \ldots, S_l^i(N-1)\}$ and $\underline{X}_l^i = \{X_l^i(0), X_l^i(1), \ldots, X_l^i(N-1)\}$. The simplest of many encoding methods that can be applied to the STBC-OFDM system to prevent the SCI while satisfying all the above-described requirements can be $S_l^1 = \underline{X}_l$, $\underline{S}_{l+1}^1 = \{\varnothing\}$ and $S_l^2 = \{\varnothing\}$, $\underline{S}_{l+1}^2 = \underline{X}_l^*$, or $S_l^1 = \{\varnothing\}$, $\underline{S}_{l+1}^1 = \underline{X}_l^*$ and $S_l^2 = \underline{X}_l$, $\underline{S}_{l+1}^2 = \{\varnothing\}$. The method represents a structure that transmits a signal using one antenna in an l-th OFDM symbol period and a signal using the remaining antenna in an (l+1)-th symbol period. As a result, the interference between the antennas due to the time-variation of a channel disappears, and a simple MRC type combination is formed at a receiving end.

Meanwhile, since the Peak-to-Average power Ratio (PAR) of an OFDM signal increases in proportion to the number of sub-channels on which data are transmitted, a comb type encoding method can be employed to reduce the PAR of a transmission signal while obtaining the same SCI effect.

Figure 5:
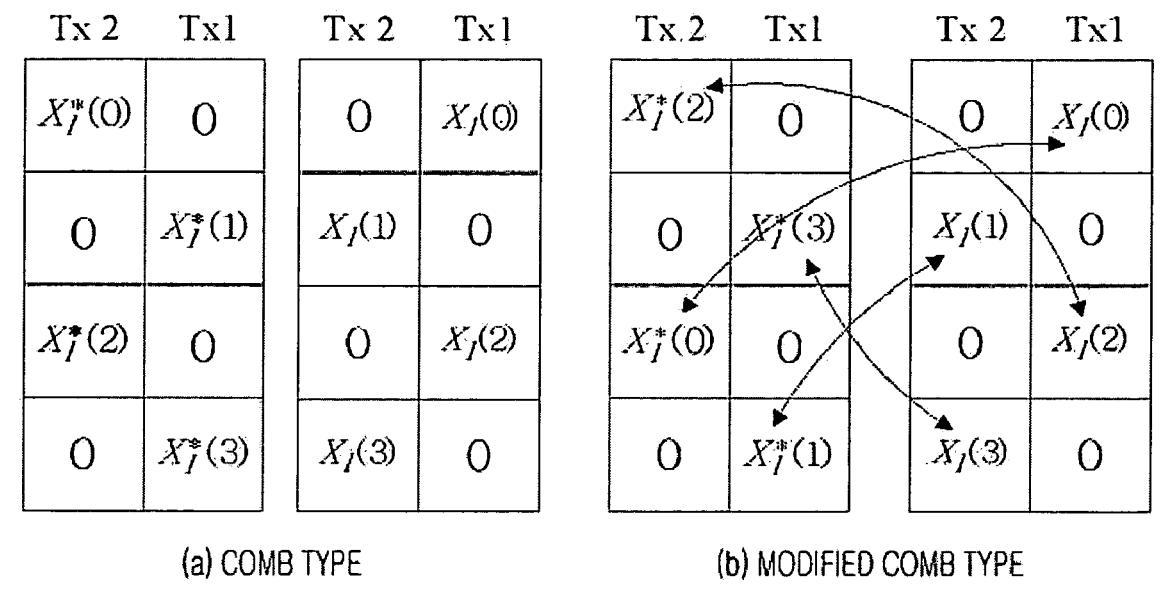

FIGS. 5a and 5b illustrate two representative methods satisfying the above-described encoding conditions, with a case in which N=4 being taken as an example. FIG. 5a illustrates a comb type encoding method, and FIG. 5b illustrates a modification of the comb type encoding method. In the case in which the method of FIG. 5a is employed, a data vector is $X_l = [X_l(0), X_l(1), \ldots, X_l(N-1)]^T$, $X_{l+i} = [0, 0, \ldots, 0]^T \in \pounds^{N \times 1}$, $l=0, M, 2M, L$, and encoding is performed using the following Equation 35 in the case in which k is even and using the following Equation 36 in which k is odd.

$$\begin{bmatrix} X_l(k) \\ X_{l+1}(k) \end{bmatrix} \xrightarrow{STBC} \begin{bmatrix} S_l^1(k) & S_l^2(k) \\ S_{l+1}^1(k) & S_{l+1}^2(k) \end{bmatrix} = \begin{bmatrix} X_l(k) & 0 \\ 0 & X_l^*(k) \end{bmatrix} \Bigg\downarrow_{time}^{\overrightarrow{space}} \quad (35)$$

$$\begin{bmatrix} X_l(k) \\ X_{l+1}(k) \end{bmatrix} \xrightarrow{STBC} \begin{bmatrix} S_l^1(k) & S_l^2(k) \\ S_{l+1}^1(k) & S_{l+1}^2(k) \end{bmatrix} = \begin{bmatrix} 0 & X_l(k) \\ X_l^*(k) & 0 \end{bmatrix} \Bigg\downarrow_{time}^{\overrightarrow{space}} \quad (36)$$

The data symbol vectors encoded using Equations 35 and 36 are as follows:

$$S_l^1 = [X_l(0), 0, X_l(2), \ldots, X_l(N-2), 0]^T \quad (37)$$

$$S_l^2 = [0, X_l(1), 0, X_l(3), \ldots, 0, X_l(N-1)]^T \quad (38)$$

$$S_{l+1}^1 = S_l^{2*} \quad (39)$$

$$S_{l+1}^2 = S_l^{1*} \quad (40)$$

If there is a correlation between two antennas, diversity gain decreases. To prevent this phenomenon, Equations 39 and 40 can be modified. That is, a signal is transmitted in an l-th OFDM symbol period using Equations 37 and 38, and shift is made such that a data symbol, which is assigned to the l-th symbol period, can be assigned to another sub-carrier in the (l+1)-th symbol period, in which case cyclic shift is made in such a way that $S_{l+1}^1 = R\{S_l^2\}_{N/2}$, $S_{l+1}^2 = R\{S_l^1\}_{N/2}$ such that all the sub-carriers have the lowest correlation. This modified method is illustrated in FIG. 5b. In the above description, $R\{\bullet\}_{N/2}$ is a function that represents the N/2 right direction cyclic shift of a vector. As a result, the data symbol transmitted in the (l+1)-th symbol period can be represented by Equations 41 and 42.

$$S_{l+1}^1(m) = S_l^{2*}((m+N/2)_{mod\ N}) \quad (41)$$

$$S_{l+1}^2(m) = S_l^{1*}((m+N/2)_{mod\ N}) \quad (42)$$

In the above description, $\{\bullet\}_{mod\ N}$ is a function that obtains the remainders of division by N. In the case of using Equations 41 and 42, the decision symbol is given from Equation 14 or 15, as follows:

$$Z_l(m) = \Gamma_l^{2 \times 1}(m) X_l(m) + \{\Omega_l^{2 \times 1}(m)\} + W_l^{2 \times 1}(m) \quad (43)$$

From Equation 43, it can be understood that the SCI term has disappeared. At this time, the number of sub-carriers actually used in a OFDM symbol decreases to ½, so that the effect in which the power of the ICI term $\{\Omega_l(m)\}$ decreases is additionally obtained. Although, in the above description, a case in which the number of transmitting antennas is two and the number of receiving antennas is one is taken as an example, the concept can be extended to a case in which the number of receiving antennas is more than one.

Since the STBC-OFDM system employs a plurality of continuous OFDM symbols, the SCI is generated due to a time-varying channel. Such SCI can be eliminated by space-frequency block coding that assigns orthogonal code to a sub-carrier axis other than a time axis. The STBC-OFDM system exhibits the most ideal performance in the case in which the frequency responses of adjacent sub-carriers are the same ($H_l^i(m) = L = H_l^i(m+M-1)$). However, since an infinite number of sub-carriers is not employed when the entire bandwidth is divided in STBC-OFDM, a difference occurs between the frequency responses of adjacent sub-carriers, which generates distortion in a form identical to that of the SCI in the STBC-OFDM system. As a result, the inference signal can be compensated for by applying Equation 33 derived from Equation 28 or Equation 40 derived from Equation 34 to the STBC-OFDM system.

As described above, the method of eliminating the reception interference signal of an STBC-OFDM system in a high-speed mobile channel according to the present invention is advantageous in that it can compensate for the SCI using a simple receiver structure in the STBC-OFDM system, thus allowing the STBC-OFDM system to be used in a high-speed mobile environment.

Furthermore, the STBC-OFDM system is advantageous in that it can prevent the generation of the SCI using a transmitting end encoder having a ½ coding rate, so that additional equipment is not necessary at a receiving end, thus reducing the ICI and the PAR.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for eliminating a reception interference signal of a Space-Time Block Coded Orthogonal Frequency Division-Multiplexing (STBC-OFDM) system in a high-speed mobile channel, the method comprising:
   (a) estimating a channel gain combined at a receiving end in the case of using the STBC-OFDM system in a time-varying channel;
   (b) obtaining first temporary decision symbols by performing comparison on the estimated channel gain;
   (c) obtaining second temporary decision symbols by using the first temporary decision symbols;
   (d) eliminating self-channel interference (SCI) terms by using the second temporary decision symbols and obtaining third temporary decision symbols; and
   (e) obtaining final data symbols by using the third temporary decision symbols.

2. The method as set forth in claim 1, wherein (b) defines selection parameters to select more reliable data among the first temporary decision symbols as follows:

$$A_l(m) = \{sign(\Gamma_l(m) - \Gamma_{l+1}(m)) + 1\}/2$$

$$A_{l-1}(m) = \{sign(\Gamma_{l+1}(m) - \ominus_l(m)) + 1\}/2$$

where: $A_l$ is a selection parameter, $F_l$ is the signal component gain and l and m are integers.

3. The method as set forth in claim 1, wherein (c) is performed such that both $A_1(m)$ and $A_{l+1}(m)$ have values of 0 or 1, and using the values of $A_l(m)$ and $A_{l+1}(m)$, the second temporary decision symbols are obtained as follows:

$$\check{X}_{l+d}(m) = A_{l+d}(m) X_{l+d}^{\%}(m), \, d=0,1$$

where: $A_l$ is a selection parameter, $X_{l+d}^{\%}$ is the first temporary decision symbol, and l and m are integers.

4. The method as set forth in claim 1, wherein (d) is performed by eliminating the SCI terms from $Z_l(m)$ and $Z_{l+1}(m)$ using the second temporary decision symbols and obtaining the third temporary decision symbols that expressed as follows:

$$\hat{X}_l(m) = \Lambda\{Z_l(m) - \mathbf{A}_l(m)\check{X}_{l+1}(m)\}A_{l+1}(m)$$

$$\hat{X}_{l+1}(m) = \Lambda\{Z_{l+1}(m) - \mathbf{A}_l^*(m)\check{X}_l(m)\}A_l(m)$$

where: $\Lambda\{.\}$ is a data decision rule, $Z_l$ is a decision variable vector, $\mathbf{A}_1$ represents the SCI caused by channel variation, $\check{X}_l$ is the second temporary decision symbol, $A_l$ is a selection parameter, and l and m are integers.

5. The method as set forth in claim 1, wherein (e) is performed by obtaining the final data symbols, which are expressed by the following Equation, using the third temporary decision symbols:

$$\hat{X}_{l+d}(m) = \hat{X}_{l+d}(m) + \check{X}_{l+d}(m), \, d=0,1$$

where: $\check{X}_l$ is the second temporary decision symbol, $\hat{X}_l$ is the third temporary decision symbol, and l and m are integers.

6. A method for eliminating a reception interference signal of a Space-time Block Coded Orthogonal Frequency Division-Multiplexing (STBC-OFDM) system in a high-speed mobile channel, the method comprising:

applying encoding conditions to the STBC-OFDM system to prevent generation of channel interference, wherein the encoding conditions are the following space-time block coding conditions:

$$\underline{S}_l^1 U \underline{S}_l^2 = \underline{X}_l$$

$$\underline{S}_{l+1}^1 U \underline{S}_{l+1}^2 = \underline{X}_l^*$$

$$\underline{S}_l^1 I \underline{S}_l^2 = \underline{S}_{l+1}^1 I \underline{S}_{l+1}^2 = \{\Phi\}$$

where: $S_l^i$ is the STBC encoded data and $X_l$ is the input data and further where both are complex sets, and l is an integer.

7. The method as set forth in claim 6, wherein, to prevent a decrease in diversity gain when there is a correlation between signal transmitting antennas, data symbols are represented as follows:

$$S_{l+1}^1(m) = S_l^{2*}((m+N/2)_{mod \, N})$$

$$S_{l+1}^2(m) = S_l^{1*}((m+N/2)_{mod \, N})$$

where: $S_l^i$ is a complex set, N is a size of the set, and l and m are integers.

8. The method as set forth in claim 6, further comprising:
performing encoding to reduce a Peak-to-Average power Ratio (PAR) of a symbol period, using the following space-time coding rule when k is even:

$$\begin{bmatrix} X_l(k) \\ X_{l+1}(k) \end{bmatrix} \xrightarrow{STBC} \begin{bmatrix} S_l^1(k) & S_l^2(k) \\ S_{l+1}^1(k) & S_{l+1}^2(k) \end{bmatrix} = \begin{bmatrix} X_l(k) & 0 \\ 0 & X_l^*(k) \end{bmatrix} \Big\downarrow_{time}^{\overrightarrow{space}}$$

where: $S_l^i$ and $X_l$ are complex sets, and l and k are integers.

9. The method as set forth in claim 6, further comprising:
performing encoding to reduce a PAR of a symbol period, using the following space-time coding method when k is odd:

$$\begin{bmatrix} X_l(k) \\ X_{l+1}(k) \end{bmatrix} \xrightarrow{STBC} \begin{bmatrix} S_l^1(k) & S_l^2(k) \\ S_{l+1}^1(k) & S_{l+1}^2(k) \end{bmatrix} = \begin{bmatrix} 0 & X_l(k) \\ X_l^*(k) & 0 \end{bmatrix} \Big\downarrow_{time}^{\overrightarrow{space}}$$

where: $S_l^i$ and $X_l$ are complex sets, and l and k are an integers.

10. The method as set forth in claim 7, wherein the data symbols are represented as decision symbols that are expressed by the following equation with the Self-channel Interference (SCI) terms eliminated therefrom:

$$Z_l(m) = \tau_l^{2 \times l}(m) X_l(m) + \{\Omega_l^{2 \times l}(m)\} + W_l^{2 \times l}(m)$$

where $\tau_l^{2 \times l}$ is a signal component gain, $X_l$ is a data vector, $\{\Omega_l^{2 \times l}\}$ is the inter-channel Interference (ICI), $W_l^{2 \times l}$ is a discrete-time representation of Additive White Gaussian Noise (AWGN), and l and m are integers.

11. The method as set forth in claim 8 or 9, wherein the symbol period obtained using the comb type coding method is represented by the following encoded data symbol vectors:

$$S_l^1 = [X_l(0), 0, X_l(2), \ldots, X_l(N-2), 0]^T$$

$$S_l^2 = [0, X_l(1), 0, X_l(3), \ldots, 0, X_l(N-1)]^T$$

$$S_{l+1}^1 = S_l^{2*}$$

$$S_{l+1}^2 = S_l^{1*}$$

where: T is an OFDM symbol period.

12. A method for eliminating a reception interference signal of a Space-Time Block Coded Orthogonal Frequency Division-Multiplexing (STBC-OFDM) system in a high-speed mobile channel, the method comprising:

(a) assigning orthogonal code to a sub-carrier axis and estimating a difference between frequency responses of adjacent sub-carriers;

(b) obtaining first temporary decision symbols by performing comparison on the estimated difference;

(c) obtaining second temporary decision symbols by using the first temporary decision symbols;

(d) eliminating Self-Channel Interference (SCI) term by using the second temporary decision symbols and obtaining third temporary decision symbols; and (e) obtaining final data symbols by using the third temporary decision symbols.

13. The method as set forth in claim 12, wherein (b) defines selection parameters so as to select more reliable data among the first temporary decision symbols as follows:

$$A_l(m) = \{sign(\tau_l(m) - \tau_{l+1}(m)l \,)) + 1\}/2$$

$$A_{l+1}(m) = \{sign(\tau_{l+1}(m) - \tau_l(m)) + 1\}/2$$

where: $\tau_l$ is the signal component gain, and l and m are integers.

14. The method as set forth in claim 12, wherein (c) is performed in such a way that both $A_l(m)$ and $A_{l+1}(m)$ have values of 0 or 1, and using the values of $A_l(m)$ and $A_{l+1}(m)$, the second temporary decision symbols are obtained as follows:

$$\check{X}_{l+d}(m) = A_{l+d}(m) X_{l+d}^{\%}(m), \, d=0, 1$$

where: $A_1$ is a selection parameter, $X_{l+d}^{\%}$ is the first temporary decision symbol, and l and m are integers.

15. The method as set forth in claim 12, wherein (d) is performed by eliminating Self-Channel Interference (SCI) terms from $Z_l(m)$ and $Z_{l+1}(m)$ using the second temporary decision symbols and obtaining the third temporary decision symbols that are expressed as follows:

$$\hat{X}_l(m) = \pi\{Z_l(m) - A_l(m)\check{X}_{l+1}(m)\}A_{l+1}(m)$$

$$\hat{X}_{l+1}(m) = \pi\{Z_{l+1}(m) - A_l^*(m)\check{X}_l(m)\}A_l(m)$$

where: $\pi\{.\}$ is a data decision rule, $Z_1$ is a decision variable vector, $A_l$ represents the SCI caused by channel variation, $X_l$ is the second temporary decision symbol, $A_l$ is a selection parameter, and l and m are integers.

16. The method as set forth in claim 12, wherein (e) is performed by obtaining the final data symbols, which are expressed by the following Equation, using the third temporary decision symbols:

$$\hat{X}_{l+d}(m) = \hat{X}_{l+d}(m) + \check{X}_{l+d}(m), d=0,1$$

where: $\hat{X}_l$ is the third temporary decision symbol, $X_l$ is the second temporary decision symbol, and l and m are integers.

17. A method for eliminating a reception interference signal of a Space-time Block Coded Orthogonal Frequency Division-Multiplexing (STBC-OFDM) system in a high-speed mobile channel, the method comprising:

(a) applying an encoding rule that can be applied to the STBC-OFDM system to prevent generation of channel interference;

(b) eliminating interference between antennas and achieving maximum ratio combination by transmitting a signal in a symbol period using the antennas; and (c) employing a comb type coding method to reduce PAR.

18. The method as set forth in claim 17, wherein (a) applies the following space-time block coding conditions in the OFDM symbol period:

$$\underline{S}_l^1 U \underline{S}_l^1 = \underline{X}_l$$

$$\underline{S}_{l+1}^1 U \underline{S}_{l+1}^2 = \underline{X}_l^*$$

$$\underline{S}_l^1 I \underline{S}_l^2 = \underline{S}_{l+1}^1 I \underline{S}_{l+1}^2 = \{\Phi\}$$

where: $S_l^i$ is the STBC encoded data and $X_l$ is the input data and further where both are complex sets, and l is an integer.

19. The method as set forth in claim 17, wherein, to prevent a decrease in diversity gain when there is a correlation between the antennas, data symbols are represented as follows:

$$S_{l+1}^1(m) = S_l^{2*}((m+N/2)_{mod\,N})$$

$$S_{l+1}^2(m) = S_l^{1*}((m+N/2)_{mod\,N})$$

where: $S_l^i$ is a complex set, N is a size of the set, and l and m are integers.

20. The method as set forth in claim 17, wherein, to reduce a Peak-to-Average power ratio (PAR) of the symbol period, (c) uses the following space-time coding rule when k is even:

$$\begin{bmatrix} X_l(k) \\ X_{l+1}(k) \end{bmatrix} \xrightarrow{STBC} \begin{bmatrix} S_l^1(k) & S_l^2(k) \\ S_{l+1}^1(k) & S_{l+1}^2(k) \end{bmatrix} = \begin{bmatrix} X_l(k) & 0 \\ 0 & X_l^*(k) \end{bmatrix} \Bigg\downarrow_{time}$$
$$\underrightarrow{space}$$

where: $S_l^i$ and $X_l$ are complex sets, and l and k are an integers.

21. The method as set forth in claim 17, wherein, to reduce a PAR of the symbol period, (c) uses the following space-time coding method when k is odd:

$$\begin{bmatrix} X_l(k) \\ X_{l+1}(k) \end{bmatrix} \xrightarrow{STBC} \begin{bmatrix} S_l^1(k) & S_l^2(k) \\ S_{l+1}^1(k) & S_{l+1}^2(k) \end{bmatrix} = \begin{bmatrix} 0 & X_l(k) \\ X_l^*(k) & 0 \end{bmatrix} \Bigg\downarrow_{time}$$
$$\underrightarrow{space}$$

where: $S_l^i$ and $X_l$ are complex sets, and l and k are an integers.

22. The method as set forth in claim 19, wherein the data symbols are represented as decision symbols that are expressed by the following equation with the Self-Channel Interference (SCI) terms eliminated therefrom:

$$Z_l(m) = \tau_l^{2 \times 1}(m) X_l(m) + \{\Omega_l^{2 \times 1}(m)\} + W_l^{2 \times 1}(m)$$

where: $\tau_l^{2 \times l}$ is a signal component gain, $X_l$ is a data vector, $\{\Omega_l^{2 \times l}\}$ is the Inter-Channel Interference (ICI), $W_l^{2 \times l}$ is a discrete-time representation of Additive White Gaussian Noise (AWGN), and l and m are integers.

23. The method as set forth in claim 20 or 21, wherein the symbol period obtained using the comb type coding method is represented by the following encoded data symbol vectors:

$$S_l^1 = [X_l(0), 0, X_l(2), \ldots, X_l(N-2), 0]^T$$

$$S_l^2 = [0, X_l(1), 0, X_l(3), \ldots, 0, X_l(N-1)]^T$$

$$S_{l+1}^1 = S_l^{2*}$$

$$S_{l+1}^2 = S_l^{1*}$$

where: T is an OFDM symbol period.

* * * * *